Jan. 3, 1961 W. B. PASKOWSKI ET AL 2,966,974
CLUTCH
Filed July 28, 1958 2 Sheets-Sheet 1

INVENTOR.
WALTER B. PASKOWSKI
LEOCADIA P. PRATSON
BY
H. G. Manning
ATTORNEY

Jan. 3, 1961   W. B. PASKOWSKI ET AL   2,966,974
CLUTCH
Filed July 28, 1958   2 Sheets-Sheet 2
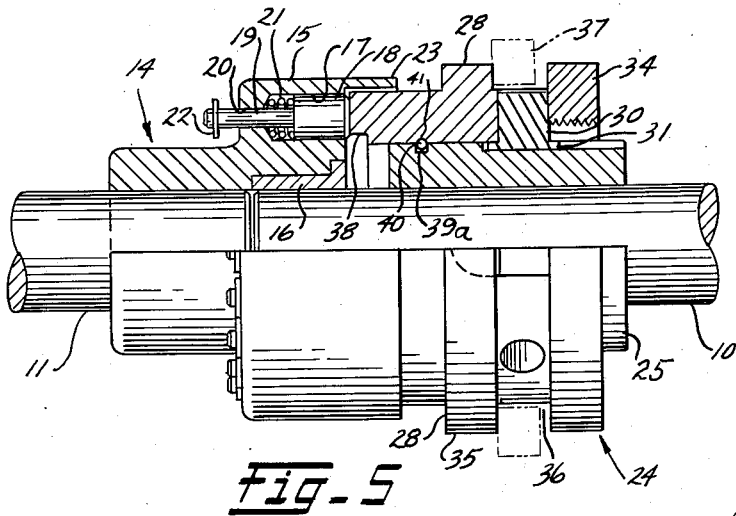
Fig_5
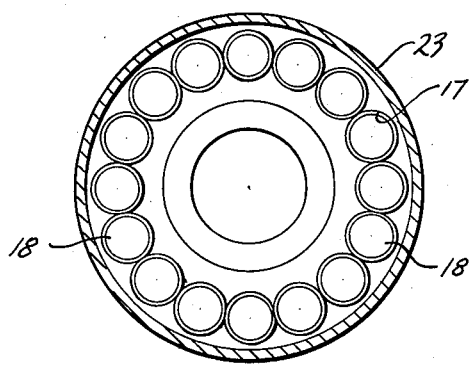
Fig_6
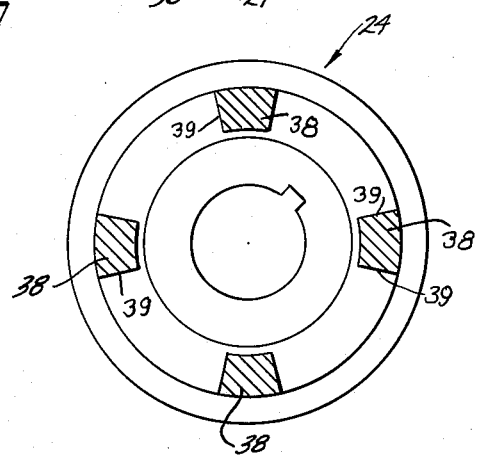
Fig_7
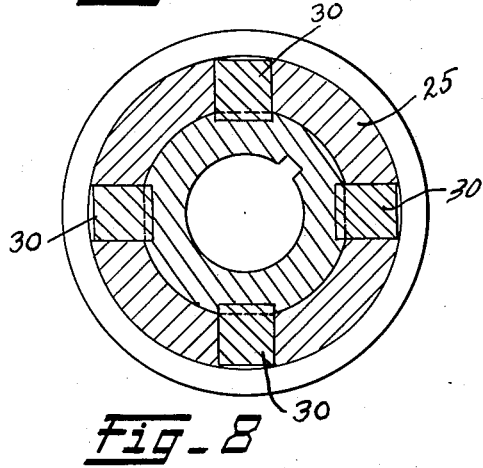
Fig_8
INVENTOR.
WALTER B. PASKOWSKI
LEOCADIA P. PRATSON
BY
H. G. Manning
ATTORNEY United States Patent Office 2,966,974
Patented Jan. 3, 1961

2,966,974
CLUTCH

Walter B. Paskowski, 69 Willow St., New Britain, and Leocadia P. Pratson, 96 Sargeant St., Hartford, Conn.

Filed July 28, 1958, Ser. No. 751,333

1 Claim. (Cl. 192—67)

Our invention relates to mechanical clutches and is directed particularly to an improved clutch of the type employed for transmitting rotary power from a common drive shaft to individual machines as required in manufacturing plants, and the like.

The principal object of our invention is to provide an improved mechanical clutch of the above nature which is simple in structure, compact, durable in use and inexpensive to manufacture.

A more particular object of the invention is to provide a clutch of the character described, wherein the driven member comprises a plurality of cylindrical pins circularly arranged about the axis of revolution and resiliently supported for movement in the axial direction, and wherein the driving member is coaxial with the driven member and comprises a lesser plurality of engagement members arranged in spaced relation about the axis of revolution and adapted to be moved against the ends of the pins whereby certain of the pins will be moved in the axial direction to allow the side faces of the engagement members to move into locking engagement against the sides of certain other of the pins, whereby the driven member will be rotated by the driving member.

Other objects, features and advantages of our invention will be apparent from the following description when read with reference to the accompanying drawings, wherein:

Fig. 5 is a side view, partly in section, of the clutch shown in engaged condition.

Figure 2:
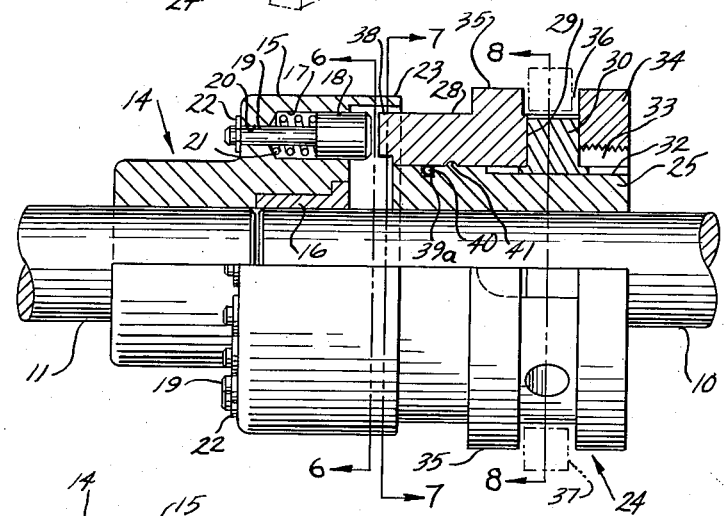
Fig. 2 is a side view, partly in vertical section, of the clutch shown in disengaged condition.

Fig. 6 is a vertical cross-sectional view, taken along the line 6—6 of Fig. 2 in the direction of the arrows, Fig. 7 is a vertical cross-sectional view, taken along the line 7—7 of Fig. 2 in the direction of the arrows, and Fig. 8 is a vertical cross-sectional view, taken along the line 8—8 of Fig. 2 in the direction of the arrows.

Figure 3:
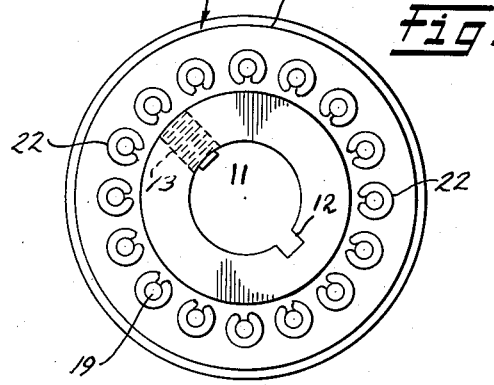
Fig. 3 is an end view of the clutch, seen from the driven end.

Referring now in detail to the drawings, wherein like reference numerals denote corresponding parts throughout the several views, the numeral 10 indicates a driving shaft, which may, for example, be a secondary shaft driven from a main source of rotary power (not illustrated), and the numeral 11 indicates a driven shaft, coaxial with the shaft 10, and adapted to transmit a portion of the rotary power to a machine to be operated Fixed upon the end of the driven shaft 11, as by a key 12 and a set screw 13 (Fig. 3) is a hollow driven member 14 having an integral annular flange portion 15 projecting forwardly over the end of said shaft 11. The central opening of the flange portion 15 is fitted with a tubular bearing member 16 within which the end of the driving shaft 10 is rotatably journalled.

The flange portion 15 of the driven member 14 is provided with sixteen circularly arranged, axially-extending bores 17, within each of which is slidably disposed a forwardly projecting cylindrical pin 18. Each pin 18 is formed with a concentric shank portion 19 of reduced diameter which projects through an opening 20 extending from the inner end of each bore 17 through the rear end surface of the annular flange portion 15 of the driven member 14.

A coil spring 21 is disposed about each of the shank portions 19 of the pins 18, acting between the heads of said pins and the inner end surfaces of the bores 17 to normally urge said pins outwardly with respect to the driven member 15. Clip rings 22, seated in suitable grooves formed in the ends of the shank portions 19 of the pins 18, limit the outward movement of said pins by their abutment against the rear end annular surface of flange portion 15 of the driven member 14. The flange portion 15 of the driven member 14 has integrally formed therewith an annular thin, forwardly-extending housing portion 23.

Figure 4:
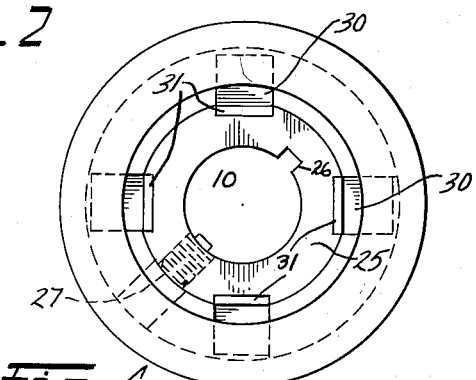
Fig 4 is an end view of the clutch, seen from the driving end.

Arranged near the end of the driving shaft 10 is a hollow driving member 24 concentric with the driven member 14 and comprising a cylindrical guide member 25 secured to said driving shaft 10 by means of a key 26 and a set screw 27 (Fig. 4). Slidably fitted about the guide member 25 is a short cylindrical sleeve member 28, rotary motion of which with respect to the guide member 25, while allowing relative axial sliding movement, is provided by four rectangular slots 29 formed in the rearmost end of said sleeve member, within which rectangular guide blocks 30 are seated.

The innermost ends of the blocks 30 are integrally formed with short axially-extending portions 31 (Fig. 4), which fit within complementary axial slots 32 provided in the rearmost end of the guide member 25.

The innermost end 33 (Fig. 2) of the sleeve member 28 is of reduced diameter and is externally threaded to receive an internally threaded annular locking member 34 which holds the guide blocks 30 securely in place. The forwardly extending portions 31 of the blocks 30 abut the inner surface of the sleeve member 28, whereby radial outward movement of said blocks is prevented.

Figure 1:
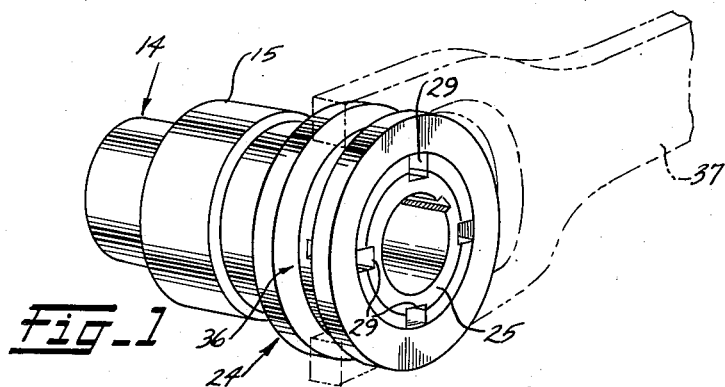
Fig. 1 is a prespective view of the improved clutch embodying the invention.

The locking member 34 at the inside of the blocks 30 and a flange portion 35 (Fig. 5) of the sleeve member 28 at the outside of said blocks are each of greater outer diameter than the remainder of the driving member 24, to provide an annular groove 36 within which a yoke 37 (Figs. 1, 2, 5) can extend, for actuating the clutch, as is hereinbelow more fully described.

The front end of the sleeve member 28 is integrally formed with four circularly-arranged, forwardly-projecting clutch engagement members 38 preferably lying in radial planes passing through the axis of revolution of the driving shaft 10.

The sleeve member 28 has an annular groove 41 for receiving a split ring 40 (Fig. 5) which is normally located in an annular groove 39a of square cross-section (Figs. 2 and 5).

Operation

In operation, the clutch engagement yoke 37 will be moved from the position of disengagement of the clutch (Fig. 2) towards the left into engaging position (Fig. 5), whereupon the rotating sleeve member 28 will be moved axially, so that its clutch engagement members 38 will push certain of the pins 18 of the driven member 14 inwardly, and then come into abutting engagement against the cylindrical surfaces of certain other of the pins 18 in advance of the pins pushed in, whereby said driven member will become engaged for cooperative rotation with the sleeve member 28 to directly drive the driven shaft 11. The clutch engagement members 38 are of such arcuate size with respect to the diameters and positions of the pins 18 of the driven member 14 that when the clutch is in engagement, as illustrated in Fig. 5, the abutting side faces at the driving sides of the clutch engagement members 38 will all bear equally against their respective pins 18.

As seen in Figs. 2 and 5, the ring 40 snaps in place within the groove 41 when the clutch is in engaged condition (Fig. 5) thereby acting as a detent to maintain the clutch in engaged position until released again by movement of the yoke 37 to disengaging position. The housing portion 23 of the annular flange 15 covers the projecting ends of the pins 18 and the clutch engagement members 38 of the sleeve member 28 in both the disengaged and engaged positions of the clutch, thereby offering protection against the entrance of dirt, grease, etc., and at the same time preventing accidental contact with these interengaging parts.

While we have shown and illustrated herein only one form in which the invention may conveniently be embodied in practice, it is to be understood that this form is presented by way of example only, and that the invention is to be limited only by the spirit and scope of the following claim.

What we claim as new and desire to secure by Letters Patent is:

A clutch comprising a driving member and a driven member mounted upon a coaxial driving shaft and a driven shaft respectively, said driving member including an internal cylindrical guide member, an external cylindrical sleeve member slidable on said guide member and having a plurality of integral rearwardly extending clutch lugs spaced equidistantly about the circumference thereof, said driving member having an annular groove adapted to receive a forked yoke for sliding said drive member rearwardly, said driven member having an enlarged forward section provided with a plurality of equidistantly spaced bores, open at their front ends and closed at their rear ends, said bores being arranged in a circle around the axis of said driven member, the inner rear end of each of the bores having a circular hole of reduced diameter within which is fitted the reduced end of a cylindrical clutch pin having the same radius as said clutch lugs, coiled compression springs within said bores, surrounding the reduced sections of said pins, said clutch lugs being smaller in number than said clutch pins, whereby when said driving member is moved rearwardly, some of said clutch pins will be moved rearwardly to allow the side faces of said clutch lugs to engage the sides of some of said clutch pins to cause said driven member to be rotated by said driving member.

References Cited in the file of this patent

UNITED STATES PATENTS

| | | |
|---|---|---|
| 212,336 | Weston | Feb. 18, 1879 |
| 241,180 | Barker | May 10, 1881 |
| 1,074,959 | Kreiling | Oct. 7, 1913 |
| 1,467,508 | Seng | Sept. 11, 1923 |
| 1,618,470 | Patterson | Feb. 22, 1927 |
| 2,413,730 | Samiran | Jan. 7, 1947 |
| 2,684,142 | Willyard et al. | July 20, 1954 |

FOREIGN PATENTS

| | | |
|---|---|---|
| 815,164 | Germany | Sept. 27, 1951 |
| 744,943 | Great Britain | Feb. 15, 1956 |